(12) United States Patent
Kitai (10) Patent No.: US 9,106,771 B2
(45) Date of Patent: Aug. 11, 2015

(54) IMAGE INSPECTION DEVICE, IMAGE INSPECTION SYSTEM, AND IMAGE INSPECTION METHOD

(71) Applicant: Tadashi Kitai, Kanagawa (JP)

(72) Inventor: Tadashi Kitai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/205,968

(22) Filed: Mar. 12, 2014

(65) Prior Publication Data

US 2014/0268259 A1    Sep. 18, 2014

(30) Foreign Application Priority Data

Mar. 15, 2013   (JP) .................................. 2013-053950
Feb. 5, 2014    (JP) .................................. 2014-020130

(51) Int. Cl.
*H04N 1/00*    (2006.01)
*H04N 1/60*    (2006.01)

(52) U.S. Cl.
CPC ......... *H04N 1/00005* (2013.01); *H04N 1/0005* (2013.01); *H04N 1/00015* (2013.01); *H04N 1/00031* (2013.01); *H04N 1/00045* (2013.01); *H04N 1/00047* (2013.01); *H04N 1/00053* (2013.01); *H04N 1/00055* (2013.01); *H04N 1/00087* (2013.01); *H04N 1/6033* (2013.01); *H04N 1/6008* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 5,856,876 A | 1/1999 | Sasanuma et al. | |
| 2006/0285134 A1* | 12/2006 | Viturro et al. | 358/1.9 |
| 2008/0204829 A1* | 8/2008 | Harrington | 358/504 |
| 2009/0296110 A1* | 12/2009 | Mestha et al. | 358/1.9 |
| 2012/0086983 A1* | 4/2012 | Taylor et al. | 358/3.01 |
| 2012/0320388 A1* | 12/2012 | Eschbach et al. | 358/1.9 |
| 2013/0222823 A1* | 8/2013 | Hyoki et al. | 358/1.9 |
| 2013/0235396 A1* | 9/2013 | Hyoki et al. | 358/1.9 |

FOREIGN PATENT DOCUMENTS

| | | |
|---|---|---|
| JP | 08-289149 | 11/1996 |
| JP | 2002-231015 | 8/2002 |
| JP | 2006-217192 | 8/2006 |
| JP | 2006-268213 | 10/2006 |
| JP | 2008-055725 | 3/2008 |
| JP | 2009-226801 | 10/2009 |
| JP | 2010-098491 | 4/2010 |
| JP | 4529577 | 8/2010 |
| JP | 2011-197812 | 10/2011 |

* cited by examiner

*Primary Examiner* — Kimberly A Williams
(74) *Attorney, Agent, or Firm* — Oblon, McClelland, Maier & Neustadt, L.L.P.

(57) ABSTRACT

An image inspection device includes: a read-image acquiring unit that acquires a read image of a formed and output image; an inspection-image generating unit that generates an inspection image used for inspection of the read image on the basis of information of an image to be formed and output acquired from an image processing apparatus that corrects density of the image according to a state of an image forming apparatus, and generates the information; and an inspection-result acquiring unit that acquires a result of determination of a defect in the read image based on a difference between the inspection image and the read image. The inspection-image generating unit acquires density correction information in which densities before and after density of the image is corrected are associated, and generates the inspection image corresponding to density before corrected, on the basis of the acquired density correction information.

6 Claims, 9 Drawing Sheets

MASTER IMAGE  READ IMAGE

| INPUT GRADATION VALUE | OUTPUT GRADATION VALUE | | | |
|---|---|---|---|---|
| | C | M | Y | K |
| 255 | 255 | 255 | 255 | 255 |
| 254 | 255 | 255 | 255 | 255 |
| 253 | 255 | 255 | 255 | 255 |
| ... | ... | ... | ... | ... |
| 230 | 243 | 243 | 243 | 243 |
| ... | ... | ... | ... | ... |
| 3 | 5 | 5 | 5 | 5 |
| 2 | 4 | 4 | 4 | 4 |
| 1 | 3 | 3 | 3 | 3 |
| 0 | 0 | 0 | 0 | 0 |

| PATTERN DENSITY | READ GRADATION VALUE | | | |
|---|---|---|---|---|
| | C | M | Y | K |
| 100% | 245 | 245 | 245 | 245 |
| 90% | 232 | 232 | 232 | 232 |
| 80% | 220 | 220 | 220 | 220 |
| ... | ... | ... | ... | ... |
| 40% | × | × | × | × |
| 30% | × | × | × | × |
| 20% | × | × | × | × |
| 10% | × | × | × | × |

FIG.9

| READ TONE VALUE | PATTERN DENSITY | | | |
|---|---|---|---|---|
| | C | M | Y | K |
| 255 | 100% | 100% | 100% | 100% |
| 230 | 80% | 80% | 80% | 80% |
| ... | ... | ... | ... | ... |
| 51 | 10% | 10% | 10% | 10% |
| 25 | 5% | 5% | 5% | 5% |
| 0 | 0% | 0% | 0% | 0% |

| C | | M | | Y | | K | |
|---|---|---|---|---|---|---|---|
| INPUT | OUTPUT | INPUT | OUTPUT | INPUT | OUTPUT | INPUT | OUTPUT |
| 255 | 255 | 255 | 255 | 255 | 255 | 255 | 255 |
| 254 | 250 | 254 | 250 | 254 | 250 | 254 | 250 |
| 253 | 245 | 253 | 245 | 253 | 245 | 253 | 245 |
| ... | ... | ... | ... | ... | ... | ... | ... |
| 3 | 2 | 3 | 2 | 3 | 2 | 3 | 2 |
| 2 | 1 | 2 | 1 | 2 | 1 | 2 | 1 |
| 1 | 1 | 1 | 1 | 1 | 1 | 1 | 1 |
| 0 | 0 | 0 | 0 | 0 | 0 | 0 | 0 |

FIG.17

IMAGE INSPECTION DEVICE, IMAGE INSPECTION SYSTEM, AND IMAGE INSPECTION METHOD

CROSS-REFERENCE TO RELATED APPLICATIONS

The present application claims priority to and incorporates by reference the entire contents of Japanese Patent Application No. 2013-053950 filed in Japan on Mar. 15, 2013 and Japanese Patent Application No. 2014-020130 filed in Japan on Feb. 5, 2014.

BACKGROUND OF THE INVENTION

1. Field of the Invention

The present invention relates to an image inspection device, an image inspection system, and an image inspection method.

2. Description of the Related Art

Conventionally, inspection of printed sheets is performed by hand; however, a device that performs inspection of printed sheets as post-processing of offset printing has been used in recent years. Such an inspection device first generates a reference master image by reading a non-defective image selected by hand from among read images of printed sheets. Then, the inspection device compares a portion of the generated master image and corresponding portions of read images of printed sheets to be inspected, and determines whether the printed sheets have any defects on the basis of the degree of difference from the portion of the master image.

However, plateless printers such as electrophotographic printers, which have been in widespread use in recent years, are suited especially for printing a few copies, and it is often the case that print content differs from page to page, for example, as in the case of variable data printing; therefore, generating a master image from printed sheets and using the master image to compare like an offset printing press is inefficient. To cope with this problem, a master image can be generated from print data. This makes it possible to efficiently handle variable data printing (for example, see Japanese National Publication of International Patent Application No. 2002-531015).

Meanwhile, in an image forming apparatus, even in the case of copies output on the basis of the same image, the copies may vary in density due to aged deterioration of an image formation engine that supplies developer to sheets. For example, in the case of an image forming apparatus that adopts the above-described electrophotographic system, the density may decrease due to deterioration of a light source that exposes a photoreceptor to light or deterioration of developing bias used in development of an electrostatic latent image, etc.

To cope with such issues, there may be used a method to print predetermined density patterns of color patches and correct the density of image information input to an engine in accordance with a read result of respective densities of the printed color patches (for example, see Japanese Patent Application Laid-open No. H8-289149).

A master image as described above is preferably generated on the basis of an image input to an engine to reduce the influence caused by image processing as much as possible. On the other hand, when the density of an image input to an engine is corrected using the technology disclosed in Japanese Patent Application Laid-open No. H8-289149, a master image is generated on the basis of an image reflected with a result of the correction.

The above-described correction of an image input to an engine is performed to keep the density of an image generated on a sheet by supply of developer from the engine constant. On the other hand, when a master image is generated on the basis of an image reflected with a result of the density correction, the density of a generated master image varies depending on the correction, and this density variation causes a difference in density between a read image obtained by reading an output sheet and the master image. As a result, even if the image has no defect, the image may be determined to be defective due to the density variation. Incidentally, such a problem may arise in image formation and output on sheets as well as recording media in general, such as films.

In view of the above, there is a need to enable generation of a master image corresponding to density correction of an image to be formed and output in a system that inspects a result of image formation and output by comparing a read image obtained by reading a sheet and an image for inspection.

SUMMARY OF THE INVENTION

It is an object of the present invention to at least partially solve the problems in the conventional technology.

An image inspection device inspects a read image obtained by reading an image formed and output on a sheet. The image inspection device includes: a read-image acquiring unit that acquires a read image generated by reading a formed and output image; an inspection-image generating unit that generates an inspection image used for inspection of the read image on the basis of information of an image to be formed and output acquired from an image processing apparatus that generates the information of the image to be formed and output; and an inspection-result acquiring unit that acquires a result of determination of a defect in the read image based on a difference between the inspection image and the read image. The image processing apparatus corrects density of the image to be output according to a state of an image forming apparatus that performs image formation and output, to generate the information of the image to be formed and output. The inspection-image generating unit acquires density correction information in which densities before and after density of the image is corrected by the image processing apparatus are associated, and generates the inspection image corresponding to density before corrected by the image processing apparatus, on the basis of the acquired density correction information.

An image inspection system inspects a read image obtained by reading an image formed and output on a sheet. The image inspection system includes: an image processing apparatus that corrects density of an image to be output according to a state of an image forming apparatus which performs image formation and output, and generates information of the image to be formed and output; an image forming unit that performs image formation and output on the basis of the information of the image to be formed and output; an image reading unit that generates a read image by reading a sheet on which an image has been formed and output; an inspection-image generating unit that generates an inspection image used for inspection of the read image on the basis of the information of the image to be formed and output; and an inspection-result acquiring unit that acquires a result of determination of a defect in the read image based on a difference between the inspection image and the read image. The inspection-image generating unit acquires density correction information in which densities before and after density of the image is corrected by the image processing apparatus are associated, and generates the inspection image corresponding to density before corrected by the image processing apparatus, on the basis of the acquired density correction information.

An image inspection method inspects a read image obtained by reading an image formed and output on a sheet. The image inspection method includes: acquiring a read image generated by reading a formed and output image; acquiring information of an image to be formed and output from an image processing apparatus that corrects density of an image to be output according to a state of an image forming apparatus, which performs image formation and output, and generates the information of the image to be formed and output; acquiring density correction information in which densities before and after density of the image is corrected are associated from the image processing apparatus; generating an inspection image corresponding to density before corrected by the image processing apparatus, on the basis of the acquired density correction information and the information of the image to be formed and output; and acquiring a result of determination of a defect in the read image based on a difference between the inspection image and the read image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
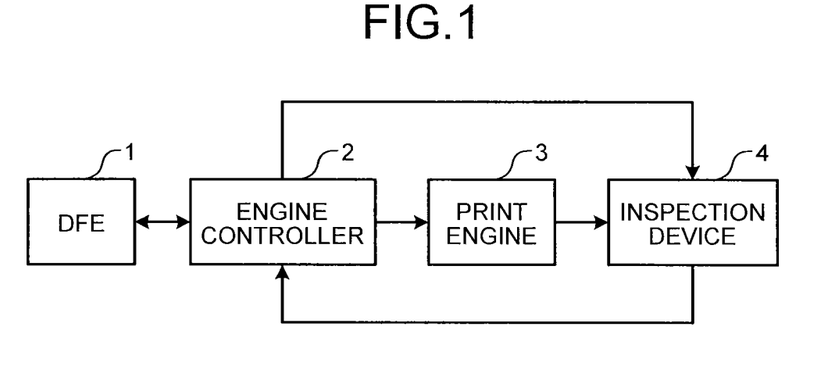
FIG. 1 is a diagram showing a configuration of an image forming system including an inspection device according to an embodiment of the present invention.

An exemplary embodiment of the present invention will be explained in detail below with reference to accompanying drawings. In the present embodiment, there is described an image inspection system including an inspection device that inspects an output result of image formation and output by comparing a read image obtained by reading the output result with a master image, and in the image inspection system, how the master image is generated when the density of original image data is adjusted in accordance with a change in a state of an image forming apparatus is explained. FIG. 1 is a diagram showing an entire configuration of an image forming system according to the present embodiment. As shown in FIG. 1, the image forming system according to the present embodiment includes a digital front end (DFE) 1, an engine controller 2, a print engine 3, and an inspection device 4.

The DFE 1 is an image processing apparatus that generates image data to be printed out, i.e., bitmap data of an image to be output on the basis of a received print job, and outputs the generated bitmap data to the engine controller 2. Furthermore, the DFE 1 according to the present embodiment adjusts the density of bitmap data to be generated in accordance with a change in a state of the print engine 3 which is an image forming apparatus.

The engine controller 2 controls the print engine 3 and causes the print engine 3 to perform image formation and output on the basis of the bitmap data received from the DFE 1. Furthermore, the engine controller 2 according to the present embodiment transmits the bitmap data received from the DFE 1 to the inspection device 4 as information to be the original of an image for inspection to refer to when the inspection device 4 inspects a result of the image formation and output performed by the print engine 3. At this time, the engine controller 2 also transmits information of a gradation value table used in the density adjustment by the DFE 1 to the inspection device 4.

The print engine 3 is an image forming apparatus that performs image formation and output on a sheet, which is a recording medium, on the basis of the bitmap data in accordance with the control by the engine controller 2. Incidentally, besides the above-described sheet, any sheet-like material, such as film or plastic, can be used as a recording medium as long as an image can be formed/output on the material. The inspection device 4 is an image inspection device that generates a master image on the basis of the bitmap data input from the engine controller 2. At this time, the inspection device 4 adjusts the density of the image on the basis of the information of the gradation value table received from the engine controller 2. This processing is one essential aspect of the present embodiment. Then, the inspection device 4 inspects an output result by comparing a read image generated by a reading device reading the sheet output by the print engine 3 with the generated master image.

When the inspection device 4 has determined that the output result has a defect through the comparison between the master image and the read image, the inspection device 4 notifies the engine controller 2 of information indicating a page determined to be defective. Accordingly, the engine controller 2 performs control for reprinting the defective page.

Figure 2:
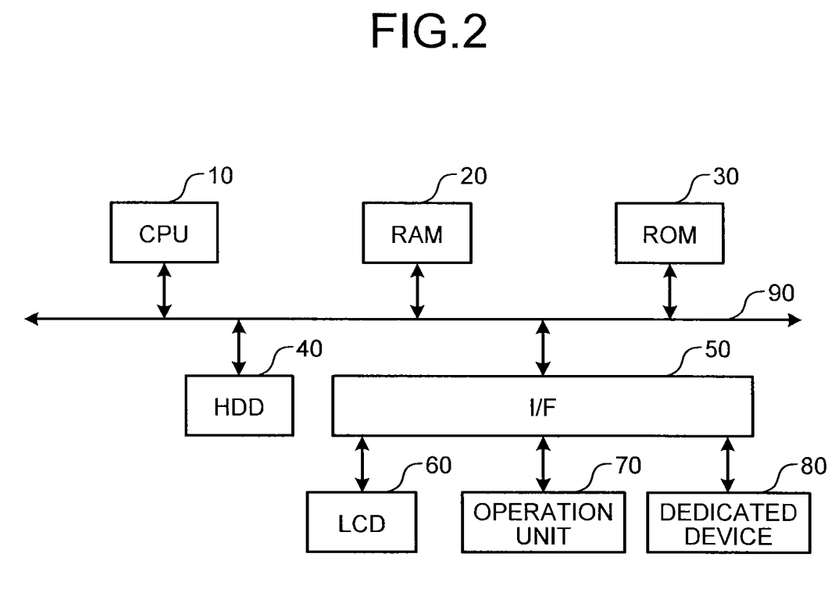
FIG. 2 is a block diagram showing a hardware configuration of the inspection device according to the embodiment of the present invention.

Here, a configuration of hardware composing respective functional blocks of the engine controller 2, the print engine 3, and the inspection device 4 according to the present embodiment is explained with reference to FIG. 2. FIG. 2 is a block diagram showing a hardware configuration of the inspection device 4 according to the present embodiment. Although FIG. 2 shows the hardware configuration of the inspection device 4, the engine controller 2 and the print engine 3 have much the same hardware configuration as the inspection device 4.

As shown in FIG. 2, the inspection device 4 according to the present embodiment has the same configuration as a general information processing apparatus such as a personal computer (PC) or a server. Specifically, the inspection device 4 according to the present embodiment includes a central processing unit (CPU) 10, a random access memory (RAM) 20, a read-only memory (ROM) 30, a hard disk drive (HDD) 40, and an interface (I/F) 50, and these hardware components are connected by a bus 90. Furthermore, a liquid crystal display (LCD) 60, an operation unit 70, and a dedicated device 80 are connected to the I/F 50.

The CPU 10 is a computing unit, and controls the operation of the entire inspection device 4. The RAM 20 is a volatile storage medium capable of high-speed information read/write operations, and is used as a work area when the CPU 10 processes information. The ROM 30 is a read-only non-volatile storage medium, and a program such as firmware has been stored in the ROM 30. The HDD 40 is a non-volatile storage medium capable of information read/write operations, and an operating system (OS), various control programs and application programs, etc. have been stored in the HDD 40.

The I/F 50 connects the bus 90 with each hardware and a network, etc. and controls the connections. The LCD 60 is a visual user interface provided for a user to check a state of the inspection device 4. The operation unit 70 is a user interface, such as a keyboard and a mouse, through which the user inputs information to the inspection device 4.

The dedicated device 80 is hardware for realizing a dedicated function in each of the engine controller 2, the print engine 3, and the inspection device 4; in the case of the print engine 3, the dedicated device 80 is a conveyance mechanism that conveys a sheet on which an image is to be formed/output or a plotter that forms/outputs an image on a sheet. Furthermore, in the cases of the engine controller 2 and the inspection device 4, the dedicated device 80 is a dedicated computing device for performing image processing at high speed. Such a computing device is composed of, for example, an application specific integrated circuit (ASIC). Moreover, the dedicated device 80 includes a reading device that reads an image output on a sheet.

In such a hardware configuration, a program stored in a recording medium, such as the ROM 30, the HDD 40, or an optical disk (not shown), is loaded into the RAM 20, and the CPU 10 performs an operation in accordance with the program, thereby a software control unit is made up. The functional blocks that realize the functions of the engine controller 2, the print engine 3, and the inspection device 4 according to the present embodiment are composed of combinations of the software control unit made up in this way and hardware.

Figure 3:
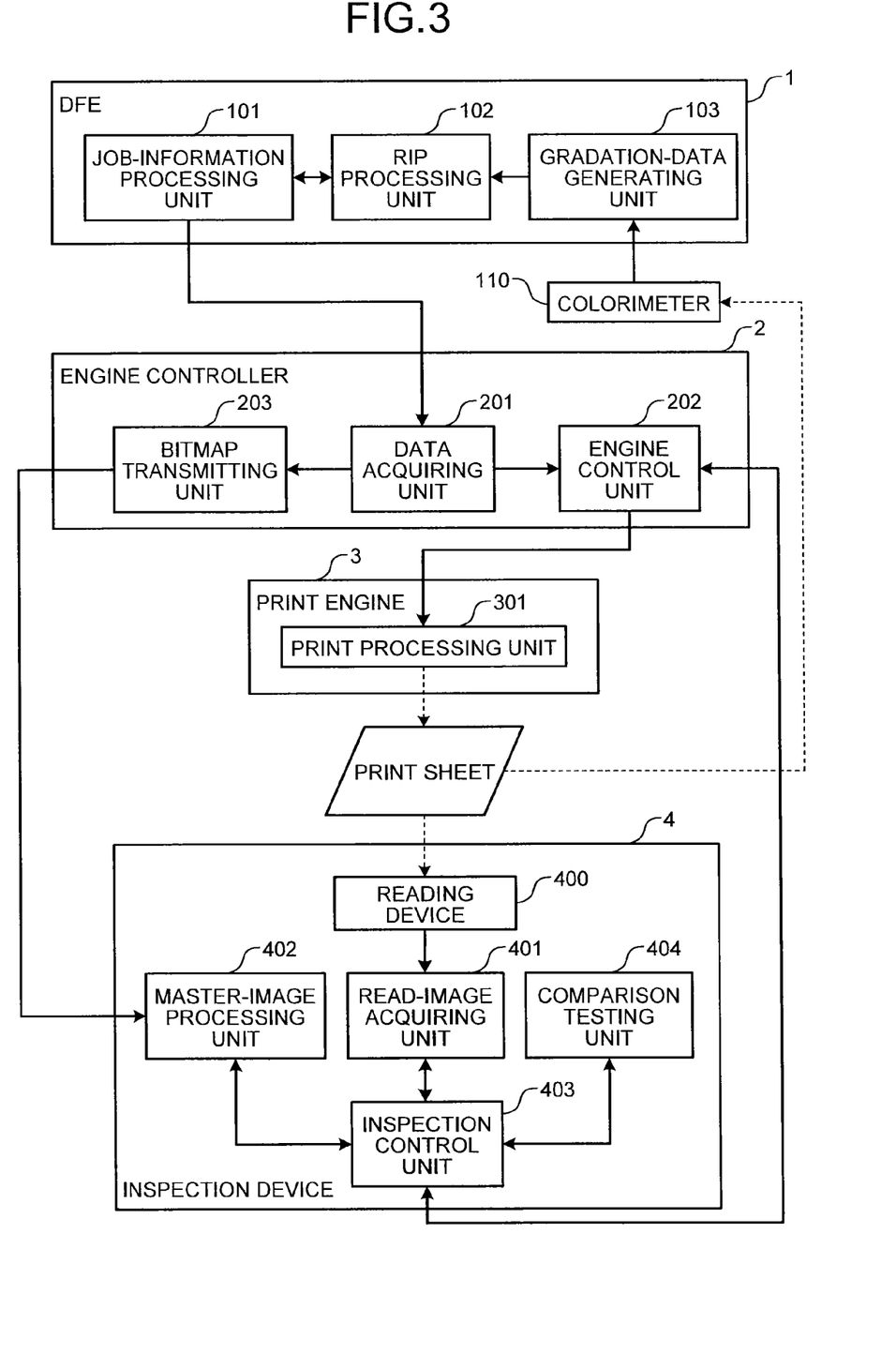
FIG. 3 is a block diagram showing respective functional configurations of a DFE, an engine controller, a print engine, the inspection device, and a post-processing apparatus according to the embodiment of the present invention.

FIG. 3 is a block diagram showing respective functional configurations of the DFE 1, the engine controller 2, the print engine 3, and the inspection device 4 according to the present embodiment. In FIG. 3, transmission/reception of data is indicated by a solid line, and the flow of a sheet is indicated by a dashed line. As shown in FIG. 3, the DFE 1 according to the present embodiment includes a job-information processing unit 101, an RIP processing unit 102, and a gradation-data generating unit 103. The engine controller 2 includes a data acquiring unit 201, an engine control unit 202, and a bitmap transmitting unit 203. The print engine 3 includes a print processing unit 301. The inspection device 4 includes a reading device 400, a read-image acquiring unit 401, a master-image processing unit 402, an inspection control unit 403, and a comparison testing unit 404.

The job-information processing unit 101 controls the execution of image formation and output on the basis of a print job input from the outside of the DFE 1 via a network or a print job generated through an operation made by an operator on the basis of image data stored in the DFE 1. In the execution of image formation and output, the job-information processing unit 101 causes the RIP processing unit 102 to generate bitmap data on the basis of image data included in the print job, and inputs the generated bitmap data to the data acquiring unit 201.

The RIP processing unit 102 generates bitmap data for the print engine 3 to execute the image formation and output on the basis of the image data included in the print job in accordance with the control by the job-information processing unit 101. The bitmap data is information of pixels composing an image to be formed/output. The print engine 3 according to the present embodiment forms an image on the basis of cyan (C), magenta (M), yellow (Y), and black (K) binary images, and outputs the formed image. On the other hand, image data included in a print job is generally an image with a large number of levels in which each pixel is represented as a gradation value in a range of, for example, 256 gradation values. Therefore, the RIP processing unit 102 converts the imaged data included in the print job from an image with a large number of levels into an image with a small number of levels, and generates bitmap data of the CMYK binary images.

In the generation of the bitmap data, the RIP processing unit 102 adjusts the density of the image on the basis of a gradation correction table generated by the gradation-data generating unit. The gradation-data generating unit 103 generates the gradation correction table on the basis of a result of colorimetric measurement of color patches by a colorimeter 110 connected to the DFE 1, and inputs the generated gradation correction table to the RIP processing unit 102. The gradation correction table used by the RIP processing unit 102 for the density adjustment of the image is input from the job-information processing unit 101 to the engine controller 2 together with the bitmap data. The reading of the color patches by the colorimeter 110 and the generation of the gradation correction table by the gradation-data generating unit 103 will be described later.

The data acquiring unit 201 acquires the bitmap data and gradation correction table input from the DFE 1, and causes the engine control unit 202 and the bitmap transmitting unit 203 to operate. The engine control unit 202 causes the print engine 3 to form and output an image on the basis of the bitmap data transferred from the data acquiring unit 201. The bitmap transmitting unit 203 transmits the bitmap data and gradation correction table acquired by the data acquiring unit 201 to the inspection device 4 so as to generate a master image.

The print processing unit 301 acquires the bitmap data input from the engine controller 2, and forms an image on a print sheet and outputs the print sheet. The print processing unit 301 according to the present embodiment is realized by a general electrophotographic image forming mechanism; however, another type of image forming mechanism, such as an ink-jet type, can also be used.

Furthermore, to optimize the density of the input bitmap data in accordance with a change in image density due to deterioration of device conditions with time or a change in operational environment, the print processing unit 301 according to the present embodiment outputs the color patches to be read by the colorimeter 110 so as to generate the above-described gradation correction table on a sheet. This will be described later.

The reading device 400 is an image reading unit that reads the image formed on the print sheet output by the print processing unit 301 and outputs the read data. The reading device 400 is, for example, a line scanner installed on a conveyance path in the inspection device 4 through which the print sheet output from the print processing unit 301 is conveyed, and reads the image formed on the surface of the print sheet by scanning the surface of the print sheet being conveyed.

The read image generated by the reading device 400 is an object of inspection by the inspection device 4. The read image is an image generated by reading the surface of the print sheet output through the image formation, and therefore is an image indicating an output result. The read-image acquiring unit 401 acquires information of the read image generated by the reading device 400 reading the surface of the print sheet. The information of the read image acquired by the read-image acquiring unit 401 is input to the comparison testing unit 404 so as to conduct a comparison test. Incidentally, the input of the read image to the comparison testing unit 404 is performed in accordance with the control by the inspection control unit 403. At this time, the inspection control unit 403 acquires the read image and then inputs the read image to the comparison testing unit 404.

The master-image processing unit 402 acquires the bitmap data input from the engine controller 2 as described above, and generates a master image which is an image for inspection to be compared with an image to be inspected. In other words, the master-image processing unit 402 serves as an inspection-image generating unit that generates the master image, which is an image for inspection used for inspection of the read image, on the basis of the image to be output. A master-image generating process performed by the master-image processing unit 402 will be described in detail later.

The inspection control unit 403 is a control unit that controls the operation of the entire inspection device 4, and the units included in the inspection device 4 operate in accordance with the control by the inspection control unit 403. The comparison testing unit 404 compares the read image input from the read-image acquiring unit 401 with the master image generated by the master-image processing unit 402, and determines whether the intended image formation and output has been executed. The comparison testing unit 404 is composed of an ASIC so as to process an enormous amount of calculation rapidly. In the present embodiment, the inspection control unit 403 controls the comparison testing unit 404 thereby serving as an image inspection unit, and also serves as a test-result acquiring unit that acquires a result of the test conducted by the comparison testing unit 404.

The comparison testing unit 404 compares the 200-dpi read image represented as 8-bit RGB values as described above with the master image on a pixel to pixel basis, and calculates a difference value between each of 8-bit RGB pixel values and a corresponding pixel value of the master image on a pixel to pixel basis. On the basis of the difference values calculated in this way and a magnitude relation with a threshold, the inspection control unit 403 determines the presence or absence of a defect in the read image. In other words, the inspection control unit 403 controls the units included in the inspection device 4, thereby serving as an image inspection unit.

Figure 4:
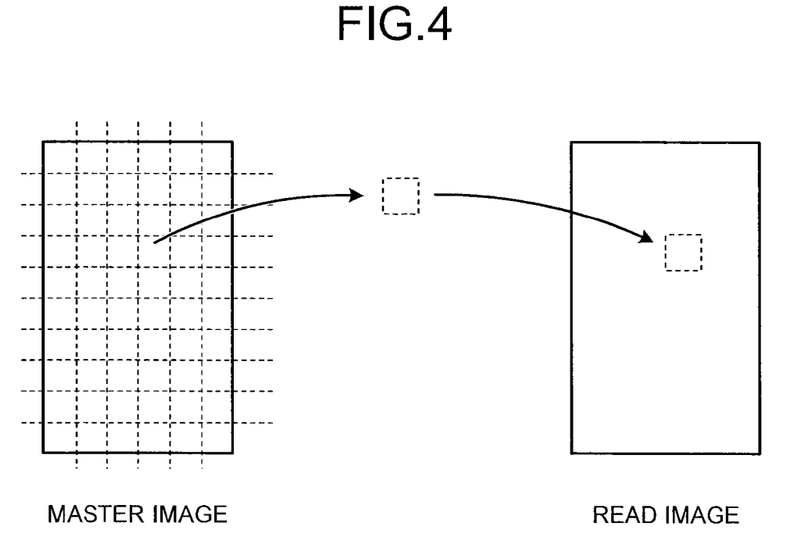
FIG. 4 is a diagram showing a mode of a comparison test according to the embodiment of the present invention.

Incidentally, in the comparison between the read image and the master image, the inspection control unit 403 superimposes a divided area of the master image divided by given area size as shown in FIG. 4 on a portion of the read image corresponding to the divided area, and calculates a difference in pixel value of each pixel, i.e., a difference in density of each pixel. Such processing is realized by the inspection control unit 403 extracting images of respective superimposed areas of the master image and the read image and inputting the extracted images to the comparison testing unit 404.

Furthermore, shifting the position of the divided area superimposed on the read image in vertical and horizontal directions, i.e., shifting the area of the read image to extract an image from in vertical and horizontal directions, the inspection control unit 403 determines an extracted area where a total value of calculated difference values is at a minimum as the exact superimposition position corresponding to the extracted area of the master image, i.e., a corresponding extracted area of the read image side, and adopts the calculated difference values between pixels in the determined extracted area as a comparison result.

As shown in FIG. 4, each of grid squares is an area by which respective difference values of pixels are summed. Furthermore, the size of each divided area shown in FIG. 4 is determined, for example, on the basis of an area by which the comparison testing unit 404 composed of the ASIC as described above can make comparisons of pixel values at once.

As another method, there is a method to determine whether each pixel is normal or defective on the basis of a result of comparison of a calculated difference value of each pixel with a threshold and compare a count value of the number of pixels determined to be defective with a preset threshold. Furthermore, instead of determining the presence or absence of a defect with respect to each of the above-described divided areas, the presence or absence of a defect can be determined with respect to each pixel.

Through such a process, a divided area of the master image is aligned on a corresponding portion of the read image, and then difference values are calculated. Then, the comparison testing unit 404 outputs vertical and horizontal shift amounts when the divided area of the master image is shifted to the alignment position together with the difference values of the pixels. For example, even if there is a difference in reduction scale between the whole read image and the whole master image, the influence of a scale can be reduced by dividing the master image by given area size and aligning a divided area of the master image on a corresponding portion of the read image as shown in FIG. 4.

Furthermore, adjacent areas in the areas divided as shown in FIG. 4 are estimated to be relatively similar in position shift amount. Therefore, when a comparison test on each divided area is conducted by calculating difference values with respect to each divided area instead of superimposing the whole read image on the master image and calculating difference values, by performing the calculation, shifting the superimposition position of the divided area in vertical and horizontal directions using a position shift amount determined by a comparison test on an adjacent area as the center, the calculation at the exact superimposition position is more likely to be performed even if the number of calculations, shifting the superimposition position of the divided area in vertical and horizontal directions is reduced, and therefore an overall calculation amount can be reduced.

Incidentally, as a method to compare magnitude relations between the difference values and the threshold, the inspection control unit 403 according to the present embodiment compares the respective difference values of the pixels calculated by the comparison testing unit 404 with a preset threshold. Accordingly, the inspection control unit 403 obtains, as a comparison result, information indicating whether a per-pixel difference between the master image and the read image exceeds a predetermined threshold. In other words, it is possible to test whether each of pixels composing the read image is defective or not. Furthermore, the size of each divided area shown in FIG. 4 is determined, for example, on the basis of an area by which the comparison testing unit 404 composed of the ASIC as described above can make comparisons of pixel values at once.

In the above embodiment, there is described an example where the comparison testing unit 404 calculates respective difference values between pixels composing the master image and pixels composing the read image and outputs the calculated difference values, and the inspection control unit 403 compares the difference values with the threshold. Alternatively, the comparison testing unit 404 can be configured to compare the difference values with the threshold, and the inspection control unit 403 can acquire a result of the comparison, i.e., information indicating, with respect to each of the pixels composing the read image, whether a difference from a corresponding pixel in the master image exceeds the predetermined threshold. Accordingly, the comparison processing by the inspection control unit 403 is transferred to the comparison testing unit 404, and therefore it is possible to achieve high-speed processing by the use of hardware.

Figure 5:
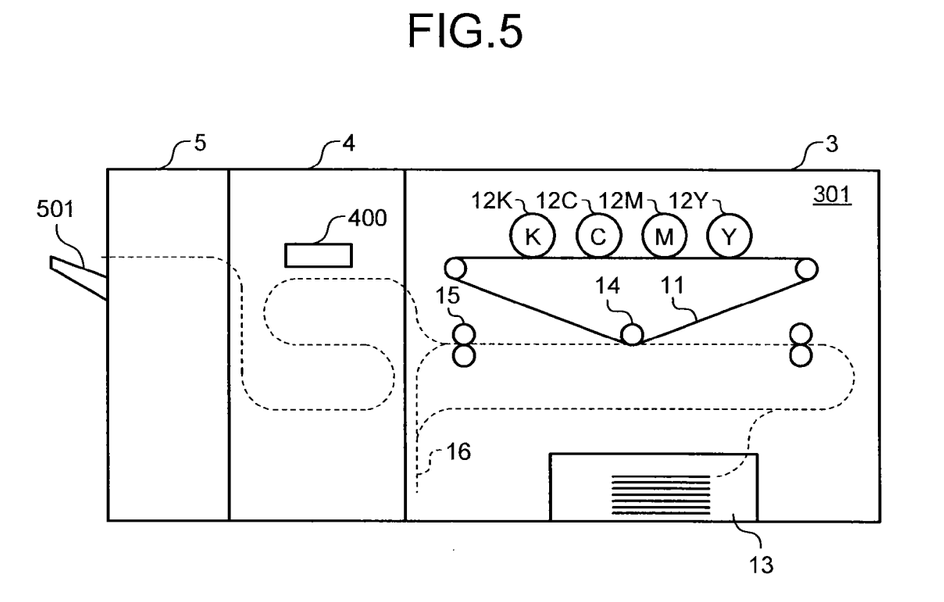
FIG. 5 is a diagram showing a configuration of the print engine according to the embodiment of the present invention.

Subsequently, respective mechanical configurations of the print engine 3, the inspection device 4, and a stacker 5 and a sheet conveyance path are explained with reference to FIG. 5. As shown in FIG. 5, the print processing unit 301 included in the print engine 3 according to the present embodiment has a configuration in which photosensitive drums 12Y, 12M, 12C, and 12K (hereinafter, referred to collectively as "photosensitive drum(s) 12") are arranged along a conveyance belt 11 which is an endless moving means, and is a so-called tandem type. That is, the multiple photosensitive drums 12Y, 12M, 12C, and 12K are arranged along the conveyance belt 11, which is an intermediate transfer belt on which an intermediate transfer image to be transferred onto a sheet (an example of a recording medium) fed from a medium tray 13 is formed, in order from the upstream side of the conveyance belt 11 in a conveying direction.

Developed Y, M, C, and K toner images formed on the surfaces of the photosensitive drums 12 are sequentially transferred onto the conveyance belt 11 so as to be superimposed on one another, thereby a full-color image is formed. The full-color image formed on the conveyance belt 11 is transferred onto the sheet by a function of a transfer roller 14 at the position at which the full-color image formed on the conveyance belt 11 comes closest to the sheet being conveyed on the sheet conveyance path indicated by a dashed line in FIG. 5.

The sheet on which the image has been formed is further conveyed, and the image is fixed on the sheet by a fixing roller 15, and after that, the sheet is conveyed into the inspection device 4. In the case of duplex printing, a sheet that an image has been formed and fixed on one side thereof is conveyed into a reverse path 16 and reversed therein, and then again conveyed to the transfer position of the transfer roller 14.

The reading device 400 reads both sides of the sheet conveyed from the print processing unit 301 on a sheet conveyance path in the inspection device 4, and generates a read image and outputs the read image to the read-image acquiring unit 401 composed of an information processing apparatus in the inspection device 4. Furthermore, the sheet read by the reading device 400 is further conveyed in the inspection device 4, and conveyed into the stacker 5, and then discharged onto a copy receiving tray 501. Incidentally, in FIG. 5, as an example, the reading device 400 is installed on the sheet conveyance path in the inspection device 4 only on the side of one side of the sheet; however, two reading devices 400 can be arranged on the sides of both sides of the sheet to make inspection of both sides of the sheet possible.

Figure 6:
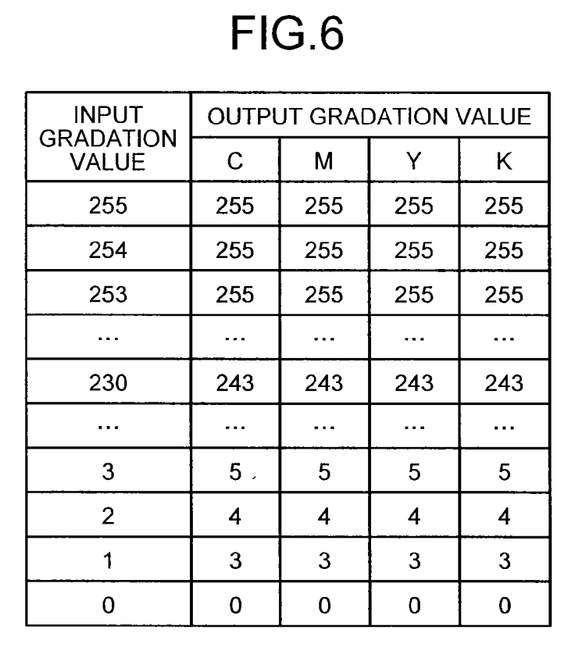
FIG. 6 is a diagram showing an example of a gradation correction table according to the embodiment of the present invention.

Subsequently, how the gradation-data generating unit 103 generates the gradation correction table is explained. FIG. 6 is a diagram showing an example of the gradation correction table according to the present embodiment. As shown in FIG. 6, the gradation correction table according to the present embodiment is a table that associates each of 256 "input gradation values" from 0 to 255 each represented as an 8-bit value with CMYK "output gradation values". In other words, the gradation correction table according to the present embodiment is density correction information used for correction of the density of bitmap data according to a state of the print engine 3, and is information on association between densities before and after the correction.

One of purposes of the density correction according to the present embodiment is to adjust the density of bitmap data to be input to the print processing unit 301 higher in advance so as to cope with reduction in density of an output image due to aged deterioration of the print processing unit 301 of the print engine 3. Therefore, "input gradation values" of "253" to "255" are all converted into the maximum output gradation value of "255" as shown in FIG. 6. Furthermore, for example, when an input gradation value is "3", it is converted into a gradation value of "5" in all of CMYK colors.

Figure 7:
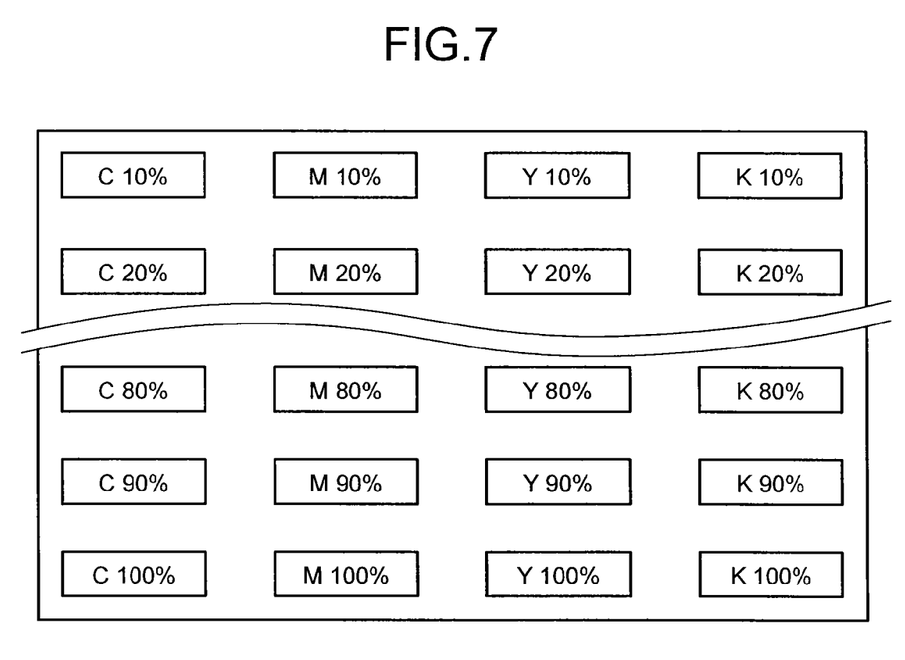
FIG. 7 is a diagram showing an example of color patches output in generation of the gradation correction table according to the embodiment of the present invention.

FIG. 7 is a diagram showing an example of the color patches which is output by the print processing unit 301 and read by the colorimeter 110 so as to cause the gradation-data generating unit 103 to generate a gradation correction table. As shown in FIG. 7, the color patches according to the present embodiment is an image of CMYK patch patterns ranging in density from 10% to 100% formed on a sheet.

Figure 8:
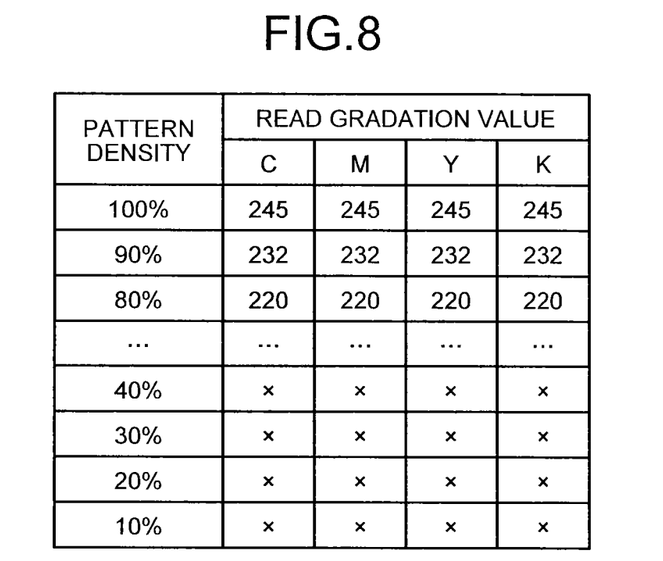
FIG. 8 is a diagram showing an example of a read result table of a result of colorimetric measurement of the color patches according to the embodiment of the present invention.

The position of the patches shown in FIG. 7 is set in advance, and the colorimeter 110 measures the density of the image shown in FIG. 7 at predetermined position. As a result, the gradation-data generating unit 103 stores a result of the measurement by the colorimeter so as to be associated with respective percentages of the measured densities corresponding to the positions on the sheet. FIG. 8 is a diagram showing an example of information of the measurement result generated in this way (hereinafter, referred to as a "read result table").

The color patches as shown in FIG. 7 is output by the print processing unit 301 of the print engine 3 as described above. Therefore, when the print processing unit 301 has deteriorated with time, resulting in a decrease in density of an output image, and respective densities of the color patches shown in FIG. 7 are also decreased. That is, even when, for example, a C-color patch with 80% density level is output, a density of the output patch is less than 80%.

Incidentally, when the print processing unit 301 is realized by an electrophotographic image formation and output mechanism as illustrated in FIG. 5, factors that decreases the density of an output image may include a decrease in light intensity of a light source that exposes the photosensitive drum 12 to light, a decrease in developing bias voltage for developing an electrostatic latent image formed on the photosensitive drum 12, and a decrease in transfer bias voltage used in transfer of a toner image developed on the photosensitive drum 12 or a toner image transferred onto the conveyance belt 11, etc.

Figure 9:
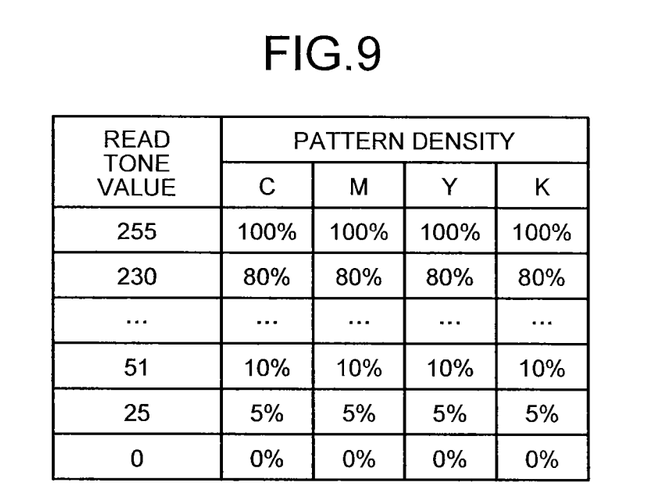
FIG. 9 is a diagram showing an ideal result table of a correspondence relation between pattern densities of the color patches and ideal read results according to the embodiment of the present invention.

The gradation-data generating unit 103 holds therein a table indicating a result when the gradation-data generating unit 103 has output an image at the intended density without decreasing the density (hereinafter, referred to as an "ideal result table") as a read result of the color patches as shown in FIG. 7. FIG. 9 is a diagram showing an example of the ideal result table. As shown in FIG. 9, in the ideal result table, respective YMCK pattern densities are associated with gradation values indicating ideal read results. Furthermore, the read gradation values shown in FIG. 9 are also gradation values used in drawing of the color patches shown in FIG. 7 with the corresponding pattern densities.

The gradation-data generating unit 103 generates a YMCK gradation correction table as shown in FIG. 6 with reference to the read result table shown in FIG. 8 and the ideal result table shown in FIG. 9. Specifically, the gradation-data generating unit 103 generates the gradation correction table as shown in FIG. 6 on the basis of respective read gradation values at each pattern density in the read result table and respective read gradation values at each pattern density in the ideal result table.

An ideal state is, for example, a state where an "80%"-density pattern is read as a gradation value of "230" as shown in FIG. 9. On the other hand, a gradation value of a read result of an "80%" pattern is "220" as shown in FIG. 8. Furthermore, as shown in FIG. 8, a gradation value of a read result of a "90%" pattern is "232"; therefore, for example, in the case of output of bitmap data corresponding to a pattern density of a little less than 90%, such as 88%, a gradation value of a read result should be "230", i.e., an ideal density of the "80%" pattern.

Therefore, the gradation-data generating unit 103 sets "230" as an "input gradation value" and a gradation value corresponding to the pattern density of a little less than 90% as an "output gradation value" in FIG. 6. This "gradation value corresponding to the pattern density of a little less than 90%" can be found, for example, by linear computation using a gradation value used for drawing an "80%" pattern and a gradation value used for drawing a "90%" pattern, and is "243" in the example shown in FIG. 6. The gradation-data generating unit 103 repeatedly performs such a calculation, and generates output gradation values corresponding to 8-bit input gradation values from 0 to 255, thereby generating a gradation correction table as shown in FIG. 6.

Incidentally, in FIG. 6 according to the present embodiment, respective "output gradation values" of CMYK colors corresponding to each "input gradation value" are all the same. Furthermore, in FIG. 8, respective "read gradation values" of CMYK colors corresponding to each "pattern density" are all the same. Moreover, in FIG. 9, respective "pattern densities" of CMYK colors corresponding to each "read gradation value" are all the same. Such situations are just for ease of illustrations, and the correlation among CMYK colors may differ as a result of individual judgment on each color.

Figure 10:
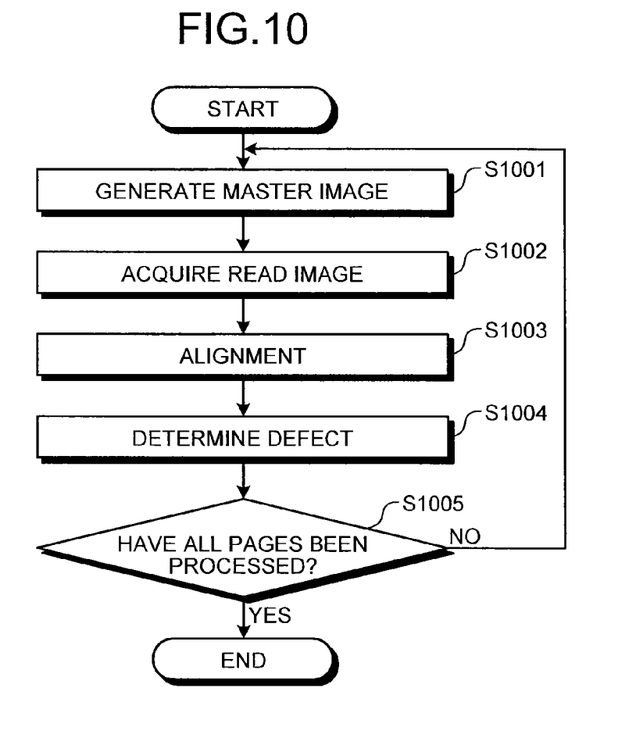
FIG. 10 is a flowchart showing operation of the inspection device according to the embodiment of the present invention.

Subsequently, the operation of the entire inspection device 4 according to the present embodiment is explained with a flowchart shown in FIG. 10. As shown in FIG. 10, in inspection of an image by the inspection device 4 according to the present embodiment, the master-image processing unit 402 generates a master image on the basis of bitmap data input from the bitmap transmitting unit 203 and the gradation correction table (Step S1001).

Around the time of transmission of the bitmap data from the bitmap transmitting unit 203 to the inspection device 4, a sheet on which an image has been formed/output by the print engine 3 is conveyed into the inspection device 4, and the reading device 400 reads the surface of the sheet, thereby the read-image acquiring unit 401 acquires a read image (Step S1002).

When the read-image acquiring unit 401 has acquired the read image, the inspection control unit 403 controls the comparison testing unit 404, and performs a process for alignment between the read image acquired by the read-image acquiring unit 401 and the master image generated by the master-image processing unit 402 (Step S1003).

Figure 16A:
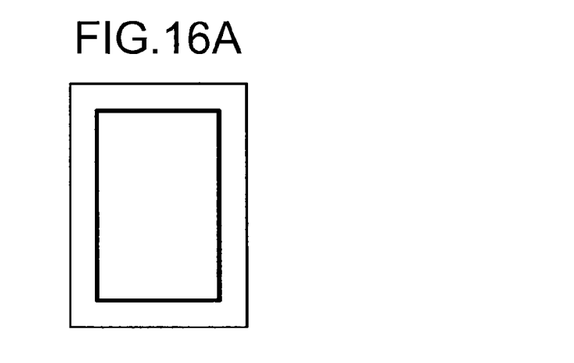
FIGS. 16A and 16B are diagrams showing an example of a result of processing by a corner extracting filter according to the embodiment of the present invention.
Figure 16B:
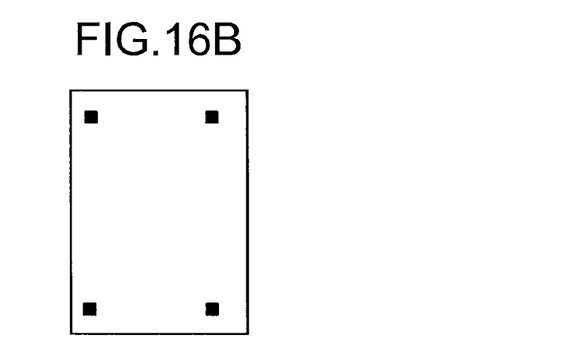

At Step S1003, the inspection control unit 403 extracts an image of a divided area as illustrated in FIG. 4 around a reference point extracted from the master image, and extracts an image of a portion of the read image corresponding to the image of the divided area extracted from the master image, and then inputs the extracted images to the comparison testing unit 404, thereby obtaining a difference value of pixel values of corresponding pixels between the images on a pixel to pixel basis as explained with reference to FIG. 4. The reference point here means markings displayed at four corners of an area in an original subject to image formation and output. Incidentally, even when there are no such markings, pixels capable of becoming markings as shown in FIG. 16B can be extracted from an image as shown in FIG. 16A with the use of an image filter, such as a corner extracting filter.

Shifting the area of an image to be extracted from the read image in vertical and horizontal directions, the inspection control unit 403 repeatedly performs the process of obtaining a result of calculation of difference values by the comparison testing unit 404 several times, and determines an extracted area of the read image where a total value of difference values is at a minimum as the position corresponding to the extracted area of the master image. A position shift amount between the extracted area of the read image determined in this way and the extracted area of the master image is determined as a position shift amount of a reference point corresponding to the image.

The inspection control unit 403 repeatedly performs the same process on multiple reference points extracted from the master image, and finds an eventual position shift amount between the master image and the read image on the basis of respective calculated position shift amounts of the reference points. In the process of finding the eventual position shift amount, for example, a method of adopting an average value of the respective calculated position shift amounts of the reference points or a method of linearly finding a position shift amount of each part of the image on the basis of the respective calculated position shift amounts of the reference points can be used.

Upon completion of the alignment through such a process, the inspection control unit 403 conduct a comparison test to compare the read image with the master image using the position shift amount between the master image and the read image found at Step S1003 (Step S1004). The process of comparing the read image with the master image is performed by performing the alignment with respect to each divided area of the image divided by given area size.

Accordingly, the inspection control unit 403 obtains the position of an image determined to be defective by the comparison testing unit 404 (hereinafter, referred to as "defect position information"). The defect position information obtained in this way is displayed on a display device such as the LCD 60 connected to the inspection device 4, or is transmitted to the engine controller 2 via a network.

The inspection control unit 403 repeats the processes from Step S1001 until inspection of all pages included in the print job are completed (NO at Step S1005), and when the processes up to Step S1004 on the all pages included in the print job are completed (YES at Step S1005), terminates the processing. Through this processing, the overall processing for the image inspection operation according to the present embodiment ends.

The gist of the present embodiment is the master-image generating process at Step S1001 in this processing. Details of functions included in the master-image processing unit 402 according to the present embodiment and the processes performed by the master-image processing unit 402 are explained below.

Figure 11:
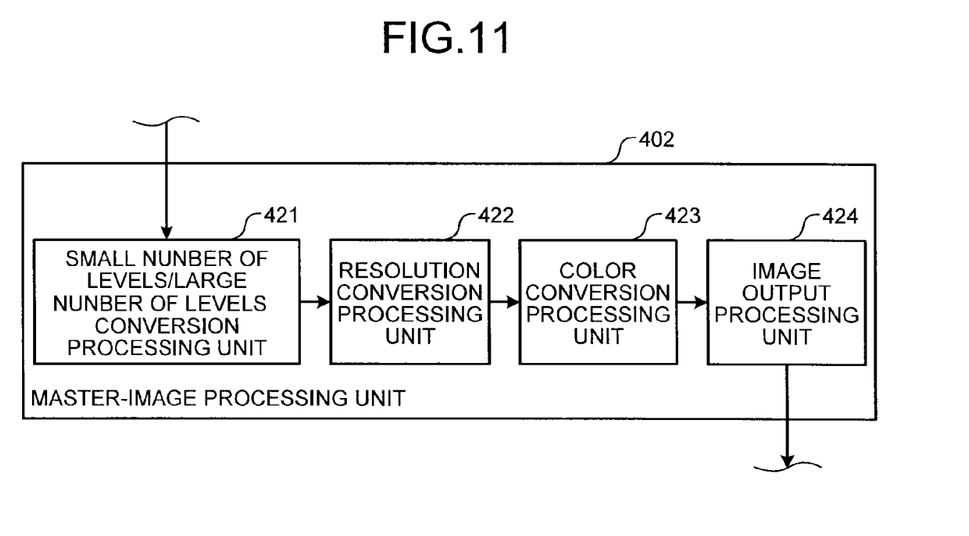
FIG. 11 is a block diagram showing a functional configuration of a master-image processing unit according to the embodiment of the present invention.
Figure 12:
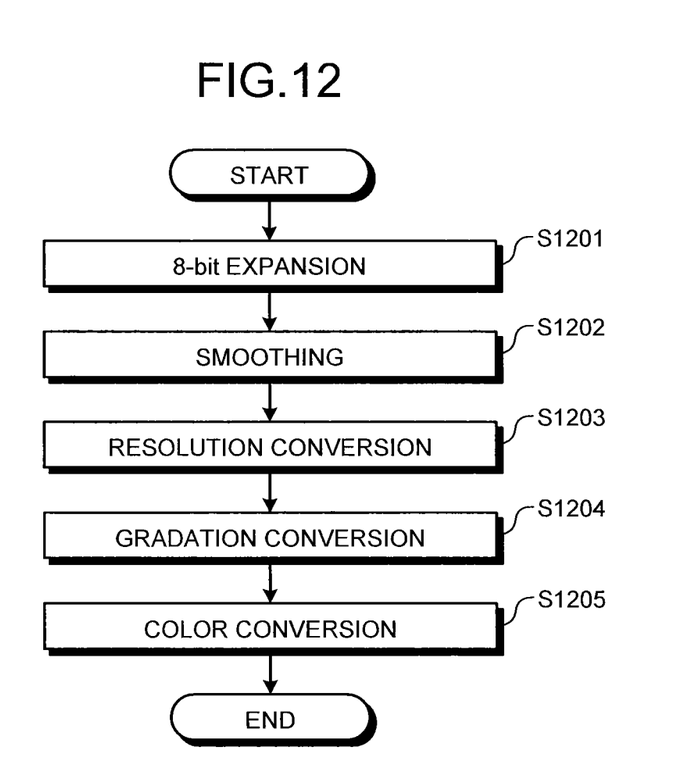
FIG. 12 is a flowchart showing a master-image generating operation according to the embodiment of the present invention.

FIG. 11 is a block diagram showing an internal configuration of the master-image processing unit 402. FIG. 12 is a flowchart showing a master-image generating operation according to the present embodiment. As shown in FIG. 11, the master-image processing unit 402 includes a small number of levels/large number of levels conversion processing unit 421, a resolution conversion processing unit 422, a color conversion processing unit 423, and an image output processing unit 424. Incidentally, the master-image processing unit 402 according to the present embodiment is realized by the dedicated device 80 illustrated in FIG. 8, i.e., hardware constituted as an ASIC operating in accordance with control by software.

The small number of levels/large number of levels conversion processing unit 421 generates an image with a large number of levels by performing a small number of levels/large number of levels conversion process on a binary image represented as colored/uncolored. Bitmap data according to the present embodiment is information to be input to the print engine 3, and the print engine performs image formation and output on the basis of respective CMYK binary images. On the other hand, a read image, which is an image to be inspected, is an image that has a large number of gradations and a large number of levels for each color of basic three primary colors: red, green, and blue (RGB). Therefore, the binary image is first converted into an image with a large number of levels by the small number of levels/large number of levels conversion processing unit 421. As the image with the large number of levels, for example, an image represented as 8-bit CMYK values can be used.

Figure 13:
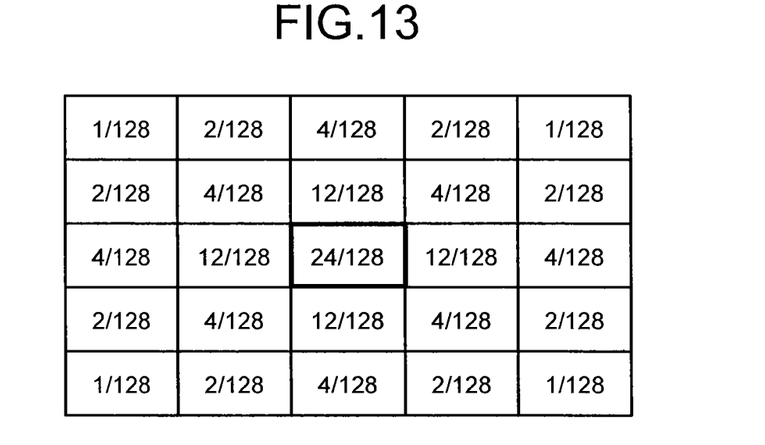
FIG. 13 is a diagram showing an example of a smoothing filter.

FIG. 12 is a flowchart showing concrete processing by the master-image processing unit 402. As shown in FIG. 12, the small number of levels/large number of levels conversion processing unit 421 performs an 8-bit expansion process (Step S1201) and a smoothing process (Step S1202) as the small number of levels/large number of levels conversion process. The 8-bit expansion process is a process to expand 1-bit data of either 0 or 1 into 8 bits and convert "0" into "0" and "1" into "255". The smoothing process is a process to smooth the image by applying a smoothing filter as shown in FIG. 13 to the 8-bit data.

Incidentally, in the present embodiment, there is described an example where the print engine 3 performs image formation and output on the basis of respective CMYK binary images, and the small number of levels/large number of levels conversion processing unit 421 is included in the master-image processing unit 402; however, this is just one example. When the print engine 3 performs image formation and output on the basis of an image with the large number of levels, the small number of levels/large number of levels conversion processing unit 421 can be omitted.

Furthermore, it could be that the print engine 3 has a function of performing image formation and output on the basis of not a 1-bit image but an image with a small number of levels, such as a 2-bit image. In this case, it can be handled in the 8-bit expansion process. That is, in the case of a 2-bit image, gradation values are four values: 0, 1, 2, and 3. Therefore, in the 8-bit expansion, "0" is converted into "0", "1" is converted into "85", "2" is converted into "170", and "3" is converted into "255".

The resolution conversion processing unit 422 performs a resolution conversion so as to conform the resolution of the image with the large number of levels generated by the small number of levels/large number of levels conversion processing unit 421 to the resolution of a read image, which is an image to be inspected. In the present embodiment, the reading device 400 generates a 200-dpi read image; therefore, the resolution conversion processing unit 422 converts the resolution of the image with the large number of levels generated by the small number of levels/large number of levels conversion processing unit 421 to 200 dpi (Step S1203). Furthermore, in the resolution conversion, the resolution conversion processing unit 422 according to the present embodiment adjusts the size of the image after the resolution conversion on the basis of predetermined magnification in consideration of shrinkage of a sheet output by the print processing unit 301.

The color conversion processing unit 423 acquires the image with the resolution converted by the resolution conversion processing unit 422, and performs a gradation conversion (Step S1204) and a conversion of color representation form (Step S1205). The gradation conversion process at Step S1204 is a process opposite to the process performed by the RIP processing unit 102 with the use of the gradation correction table illustrated in FIG. 6. That is, the color conversion processing unit 423 performs a gradation conversion for restoring the density adjusted by the RIP processing unit 102 on the basis of the gradation correction table input from the bitmap transmitting unit 203.

Figure 14:
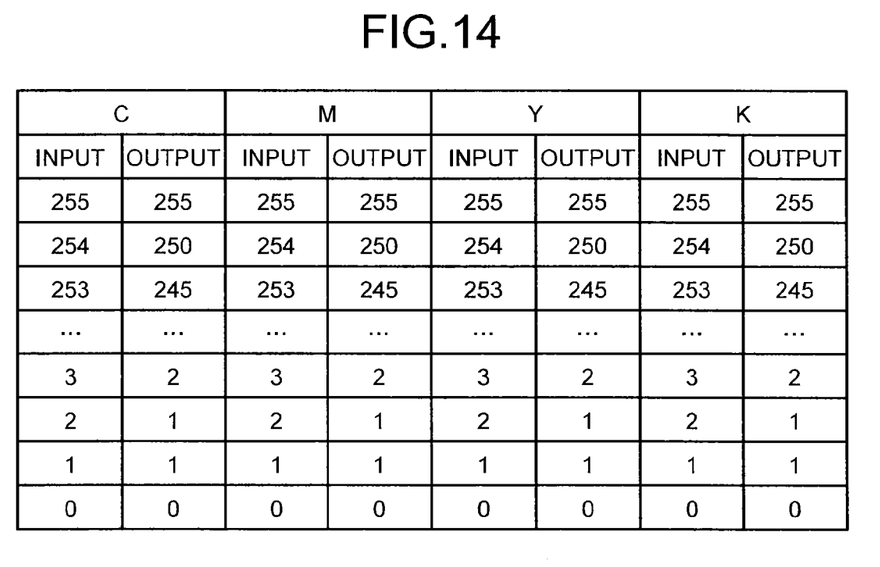
FIG. 14 is a diagram showing an example of an inverse gradation correction table according to the embodiment of the present invention.
Figure 17:
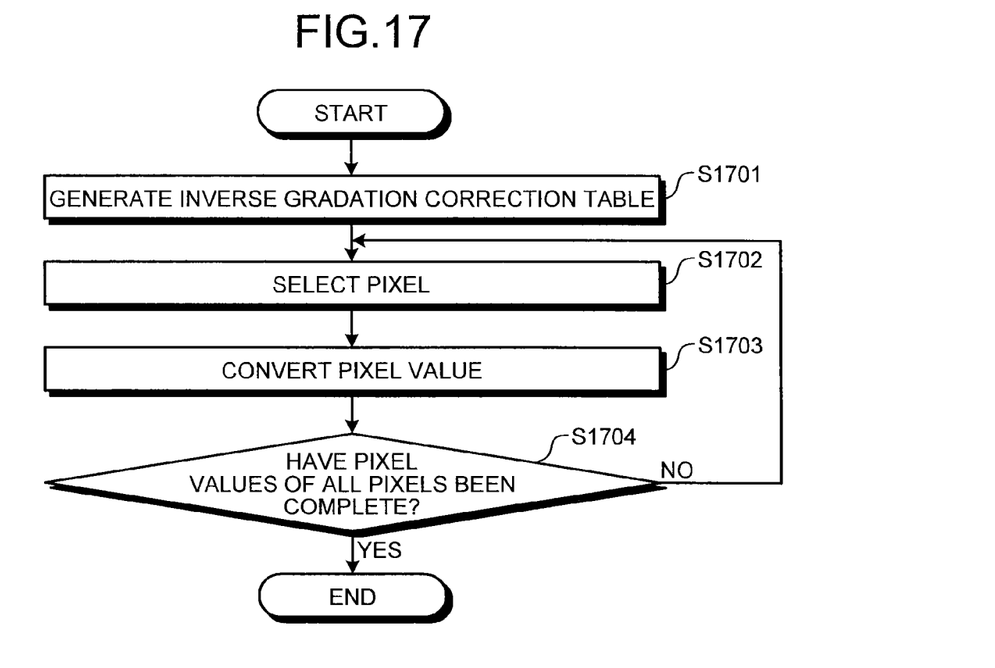
FIG. 17 is a flowchart showing an inverse gradation correcting operation according to another embodiment of the present invention.

FIG. 17 is a flowchart showing details of the gradation conversion process at Step S1204. As shown in FIG. 17, the color conversion processing unit 423 first generates an inverse gradation correction table with the use of the gradation correction table illustrated in FIG. 6 (Step S1701). The inverse gradation correction table is a table indicating color-specific correspondence of an input gradation value to an output gradation value when the color conversion processing unit 423 according to the present embodiment converts a gradation value. FIG. 14 shows an example of the inverse gradation correction table according to the present embodiment.

When having generated the inverse gradation correction table, the color conversion processing unit 423 selects a pixel from the image with the resolution converted by the resolution conversion processing unit 422 (Step S1702), and converts a pixel value of the selected pixel in accordance with the inverse gradation correction table shown in FIG. 14 (Step S1703). The color conversion processing unit 423 repeats the processes from Step S1702 until pixel values of all pixels included in the image with the resolution converted by the resolution conversion processing unit 422 have been converted (NO at Step S1704), and when pixel values of all the pixels have been converted (YES at Step S1704), the gradation conversion process at Step S1204 is completed.

As described above, the gradation correction table according to the present embodiment is intended to adjust the density of bitmap data, which is an original image, higher in advance to respond to cope with reduction in density of an image output by the print processing unit 301. When a master image is generated on the basis of the bitmap data with the density adjusted, the master image is generated at the higher density than that of an image supposed to be output normally. The higher-density master image differs in pixel values of pixels from a read image due to the density adjustment, and therefore a difference in pixel value exceeds the above-described threshold, and the read image is determined to be defective.

On the other hand, the master-image processing unit 402 according to the present embodiment generates the inverse gradation correction table as shown in FIG. 14 on the basis of the gradation correction table shown in FIG. 6, and restores the density of image data to be processed, i.e., the bitmap data with the resolution converted by the resolution conversion processing unit 422 to a previous state before the density adjustment by the RIP processing unit 102. Consequently, it is possible to cancel the difference in pixel value due to the density adjustment, and therefore possible to resolve the problems as described above.

In other words, the inverse gradation correction table shown in FIG. 14 is used as information corresponding to the density correction information by the master-image processing unit 402 to generate a master image corresponding to the density of an image before being subjected to the density correction by the RIP processing unit 102.

Incidentally, the same process can be implemented by oppositely using the "output gradation values" and "input gradation values" in the gradation correction table shown in FIG. 6 instead of generating an inverse gradation correction table as shown in FIG. 14 on the basis of the gradation correction table shown in FIG. 6 and using the inverse gradation correction table. In this case, as shown in FIG. 6, all 8-bit gradation values from 0 to 255 do not always exist on the "output gradation values" side; therefore, non-existent gradation values need to be complemented by linear computation or the like.

Furthermore, as described above, a read image according to the present embodiment is an RGB color image; therefore, the color conversion processing unit 423 converts a CMYK color image on which the gradation conversion process has been performed into an RGB color image at Step S1205. Accordingly, a 200-dpi image with a large number of levels in which each pixel is represented as 8-bit RGB values (24 bits in total) is generated. That is, in the present embodiment, the small number of levels/large number of levels conversion processing unit 421, the resolution conversion processing unit 422, and the color conversion processing unit 423 serve as an inspection-image generating unit.

The image output processing unit 424 outputs the 200-dpi image represented as 8-bit RGB values, which has been generated through the processes performed by the small number of levels/large number of levels conversion processing unit 421, the resolution conversion processing unit 422, and the color conversion processing unit 423, in accordance with control by the inspection control unit 403. Then, the inspection control unit 403 performs alignment between the master image generated by the master-image processing unit 402 and the read image acquired by the read-image acquiring unit 401, and determines the presence or absence of a defect.

As explained above, even when it is necessary to generate a master image on the basis of bitmap data of which the density is adjusted according to a change in state of the print processing unit 301, it is possible to cancel the effect of the density adjustment and perform a defect inspection of an image with the original image density through the processes described above. In other words, it is possible to generate a master image corresponding to density correction of an image to be formed/output.

Incidentally, in the above-described embodiment, there is described an example where because of a decrease in density of an image output by the print processing unit 301, the image density of bitmap data is increased by the RIP processing unit 102 in advance. However, this is just one example; therefore, in a case where the density of an image output by the print processing unit 301 is higher than an intended density, the RIP processing unit 102 performs a process of decreasing the image density of bitmap data in advance.

In either case, the print processing unit 301 outputs color patches as shown in FIG. 7, and the gradation-data generating unit 103 generates a gradation correction table as shown in FIG. 6 on the basis of a read result of the color patches by the colorimeter 110, thereby an appropriate gradation correction process is performed. Furthermore, the gradation correction table generated in this way is input to the master-image processing unit 402, and the master-image processing unit 402 performs a gradation correction in accordance with an inverse gradation correction table as shown in FIG. 14, thereby a master image according to the density of an image output by the print processing unit 301 is generated, and a suitable image comparison test is conducted.

Furthermore, in the above embodiment, there is described an example where for each print job, the job-information processing unit 101 outputs a gradation correction table, and the master-image processing unit 402, which has acquired the gradation correction table via the engine controller 2, generates an inverse gradation correction table in execution of each print job. However, the gradation correction table used by the RIP processing unit 102 is not always changed for each print job.

That is, only when the color patches illustrated in FIG. 7 is output by the print processing unit 301, and a read result table as shown in FIG. 8 is generated in accordance with a read result of the color patches by the colorimeter 110, the gradation correction table that the RIP processing unit 102 refers to is changed. Therefore, the job-information processing unit 101 does not have to output a gradation correction table for each print job; the job-information processing unit 101 can be configured to output a gradation correction table only when a gradation correction table that the RIP processing unit 102 refers to is changed, i.e., only when output of the color patches shown in FIG. 7 and reading of the color patches by the colorimeter 110 are performed.

In this case, in principle, only when the master-image processing unit 402 has acquired a new gradation correction table from the DFE 1 via the engine controller 2 with reference to an already-received gradation correction table and an already-generated and stored inverse gradation correction table, the master-image processing unit 402 generates a new inverse gradation correction table. Accordingly, a process of generating an inverse gradation correction table is performed only when needed, and therefore it is possible to make the control of the inspection device 4 more efficient.

Moreover, in the above embodiment, there is described an example where the gradation correction table shown in FIG. 6 is input to the master-image processing unit 402, and the master-image processing unit 402 generates the inverse gradation correction table shown in FIG. 14. Alternatively, an inverse gradation correction table can be generated on the DFE 1 side and input to the master-image processing unit 402 via the engine controller 2.

Furthermore, in the above embodiment, there is described an example where the gradation correction table shown in FIG. 6 and the inverse gradation correction table shown in FIG. 14 are different tables. However, both tables are the same in the point that gradation values before and after conversion are associated with each other. Therefore, a table in which all gradation values before and after conversion are specified is generated as a gradation correction table and an inverse gradation correction table, and used by reversing the direction of application of the gradation values before and after conversion between the RIP processing unit 102 and the master-image processing unit 402, so that one table can be used by both the RIP processing unit 102 and the master-image processing unit 402. Accordingly, a process of generating an inverse gradation correction table on the basis of a gradation correction table can be omitted, and processing load can be reduced.

Moreover, in the above embodiment, there is described an example where the inverse gradation correction process based on the inverse gradation correction table is performed after the small number of levels/large number of levels conversion process performed by the small number of levels/large number of levels conversion processing unit 421 and the resolution conversion process performed by the resolution conversion processing unit 422 as explained in FIGS. 11 and 12. After conversion into an 8-bit image with a large number of gradations, the gradation conversion process is performed first, and therefore, the inverse gradation correction can be performed on the basis of the inverse gradation correction table as explained in FIG. 14.

Furthermore, the gradation correction is performed on the basis of a reduced image converted into 200 dpi; therefore, the number of pixels to be calculated is reduced, and an amount of calculation can be significantly reduced.

Figure 15:
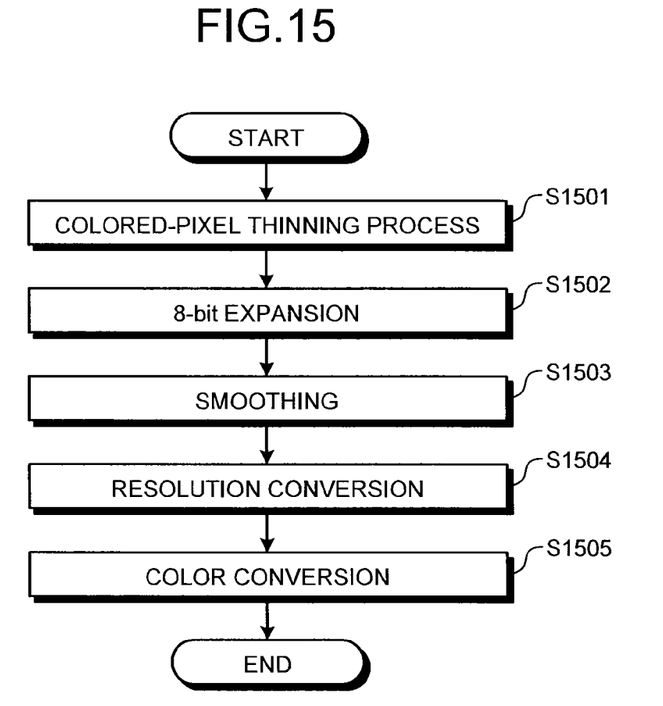
FIG. 15 is a flowchart showing a master-image generating operation according to another embodiment of the present invention.

However, this is just one example; for example, a density correction process can be performed before the 8-bit expansion process shown in FIG. 12. Operation in this case is shown in FIG. 15. As shown in FIG. 15, when the density correction process is performed before the 8-bit expansion process, an unprocessed image is a 1-bit CMYK binary image at that point. Therefore, density correction by correction of gradation values as shown in FIG. 14 is impossible.

Therefore, in an example shown in FIG. 15, the master-image processing unit 402 thins out colored pixels from a CMYK binary image, thereby adjusting the density (Step S1501). Incidentally, here, for instance, the image density has been adjusted to higher by the RIP processing unit 102; therefore, the master-image processing unit 402 performs a process of thinning out colored pixels to decrease the density. On the other hand, to increase the density, the master-image processing unit 402 has to change colored pixels to uncolored pixels.

The process at Step S1501 is performed on the basis of the inverse gradation correction table as shown in FIG. 14. For example, with respect to each of CMYK images, the master-image processing unit 402 calculates a ratio of colored pixels and uncolored pixels in a given area, and determines an 8-bit gradation value ranging from 0 to 255 in the given area. With respect to each of given areas determined in this way, colored pixels are thinned out according to an "output" gradation value corresponding to "input" with reference to the inverse gradation correction table as shown in FIG. 14. For example, when an "input" gradation value is "253" and a corresponding "output" gradation value is "245", colored pixels are thinned out so that the rate of colored pixels becomes 245/253. Accordingly, inverse gradation correction according to the inverse gradation correction table as shown in FIG. 14 can be realized.

According to the embodiment, it is possible to generate a master image corresponding to density correction of an image to be formed and output in a system that inspects a result of image formation and output by comparing a read image obtained by reading a sheet and an image for inspection.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image inspection device that inspects a read image obtained by reading an image formed and output on a sheet, the image inspection device comprising:
   a read-image acquiring unit that acquires a read image generated by reading a formed and output image;
   an inspection-image generating unit that generates an inspection image used for inspection of the read image, on the basis of information of an image to be formed and output acquired from an image processing apparatus that generates the information of the image to be formed and output; and
   an inspection-result acquiring unit that acquires a result of determination of a defect in the read image based on a difference between the inspection image and the read image, wherein
   the image processing apparatus corrects density of the image to be output according to a state of an image forming apparatus that performs image formation and output, to generate the information of the image to be formed and output, and
   the inspection-image generating unit acquires density correction information in which densities before and after a density of the image is corrected by the image processing apparatus are associated, to generate the inspection image corresponding to the density before the density of the image is corrected by the image processing apparatus, on the basis of the acquired density correction information.

2. The image inspection device according to claim 1, wherein
   the image processing apparatus converts an image with a large number of levels in which density of a pixel is represented by a large number of gradations into an image with a small number of levels in which number of gradations is smaller than that of the image with a large number of levels, to generate the information of the image to be formed and output,
   information corresponding to the density correction information is information in which values of densities of pixels represented by the large number of gradations before and after converted are associated, and
   after converting the information of the image to be formed and output into the image with the large number of levels, the inspection-image generating unit generates the inspection image corresponding to density before corrected by the image processing apparatus, on the basis of the information corresponding to the density correction information.

3. The image inspection device according to claim 1, wherein
the inspection-image generating unit converts a resolution of the image to be formed and output according to a resolution of the read image, and then corrects density on the basis of information corresponding to the density correction information.

4. The image inspection device according to claim 1, wherein
the inspection-image generating unit corrects density of the image to be formed and output on the basis of information corresponding to the already-acquired density correction information, and, only when new density correction information is output to correct density of an image to be output according to a state of the image forming apparatus, acquires information corresponding to the new density correction information, to correct density of the image to be formed and output on the basis of the acquired information corresponding to the new density correction information.

5. An image inspection system that inspects a read image obtained by reading an image formed and output on a sheet, the image inspection system comprising:
an image processing apparatus that corrects density of an image to be output according to a state of an image forming apparatus which performs image formation and output, and generates information of the image to be formed and output;
an image forming unit that performs image formation and output on the basis of the information of the image to be formed and output;
an image reading unit that generates a read image by reading a sheet on which an image has been formed and output;
an inspection-image generating unit that generates an inspection image used for inspection of the read image on the basis of the information of the image to be formed and output; and
an inspection-result acquiring unit that acquires a result of determination of a defect in the read image based on a difference between the inspection image and the read image, wherein
the inspection-image generating unit acquires density correction information in which densities before and after a density of the image is corrected by the image processing apparatus are associated, to generate the inspection image corresponding to the density before the density of the image is corrected by the image processing apparatus, on the basis of the acquired density correction information.

6. An image inspection method of inspecting a read image obtained by reading an image formed and output on a sheet, the image inspection method comprising:
acquiring a read image generated by reading a formed and output image;
acquiring information of an image to be formed and output from an image processing apparatus that corrects density of an image to be output according to a state of an image forming apparatus, which performs image formation and output, and generates the information of the image to be formed and output;
acquiring density correction information in which densities before and after a density of the image is corrected are associated from the image processing apparatus;
generating an inspection image corresponding to the density before the density of the image is corrected by the image processing apparatus, on the basis of the acquired density correction information and the information of the image to be formed and output; and
acquiring a result of determination of a defect in the read image based on a difference between the inspection image and the read image.

* * * * *